United States Patent [19]

Kalz et al.

[11] 4,088,651
[45] May 9, 1978

[54] ACYLAMINO QUINOPHTHALONE COMPOUNDS

[75] Inventors: Dietmar Kalz, Leverkusen; Gerhard Wolfrum, Opladen, both of Germany

[73] Assignee: Bayer Aktiengesellschaft, Leverkusen, Germany

[21] Appl. No.: 568,858

[22] Filed: Apr. 17, 1975

Related U.S. Application Data

[63] Continuation of Ser. No. 782,731, Dec. 10, 1968, abandoned.

[51] Int. Cl.² ............................................. C09B 25/00
[52] U.S. Cl. .................... 260/287 H; 260/289 QP; 8/1 D; 260/518 R; 260/518 A; 260/519; 260/546; 560/48
[58] Field of Search ................ 260/289 QP, 287 CE, 260/287 H

[56] References Cited

U.S. PATENT DOCUMENTS

| | | | |
|---|---|---|---|
| 2,006,022 | 6/1935 | Kranzlein et al. | 260/289 QP |
| 2,818,410 | 12/1957 | Zwilgmeyer | 260/289 QP |
| 3,023,212 | 2/1962 | Richter | 260/289 QP |
| 3,122,533 | 2/1964 | Senn | 260/289 QP |
| 3,687,929 | 8/1972 | Ramanathan et al. | 260/289 QP |
| 3,788,810 | 1/1974 | Kalz et al. | 260/289 QP |

FOREIGN PATENT DOCUMENTS

| | | | |
|---|---|---|---|
| 1,644,680 | 6/1969 | Germany | 260/289 QP |
| 1,769,789 | 1/1970 | Germany | 260/289 QP |

*Primary Examiner*—Donald G. Daus
*Assistant Examiner*—David E. Wheeler
*Attorney, Agent, or Firm*—Plumley & Tyner

[57] ABSTRACT

Acylamino quinophthalone compounds which are free from sulfonic acid groups and correspond to the formula

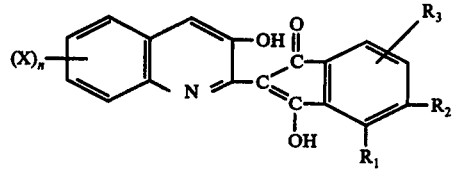

in which $R_1$ and $R_2$ are hydrogen, halogen, acylamino or lower alkoxy with the proviso that one of the residues $R_1$ and $R_2$ denotes acylamino while the other residue stands for hydrogen, halogen or a lower alkoxy; $R_3$ is hydrogen, halogen or a lower alkoxy; X is a substituent; and $n$ is a number from 0 to 3; are disclosed. The compounds useful as dyestuffs for hydrophobic fiber materials, e.g. polyester, are prepared by reacting an acylamino phthalic acid, the anhydride thereof, or mixtures of acylamino phthalic acids or the anhydrides thereof with a 3-hydroxy-quinalide.

2 Claims, No Drawings

ACYLAMINO QUINOPHTHALONE COMPOUNDS

This is a continuation of application Ser. No. 782,731, filed Dec. 10, 1968 now abandoned.

The object of the present invention comprises quinophthalone dyestuffs which are free from sulphonic acid groups and correspond to the formula

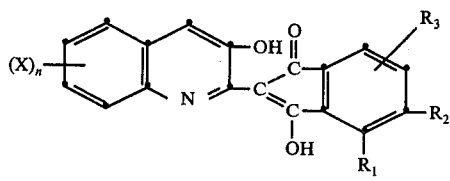

in which $R_1$ and $R_2$ stand for hydrogen, halogen, an acylamino group or a lower alkoxy group with the proviso that one of the residues $R_1$ and $R_2$ denotes an acylamino group while the other residue stands for hydrogen, halgen or a lower alkoxy group and $R_3$ stands for hydrogen, halogen or a lower alkoxy group; X is a substituent; and $n$ means a number from 0 to 3,
including, in particular, mixtures of dyestuffs of the formula (I) in which $R_1$ stands for an acylamino group and $R_2$ for hydrogen with dyestuffs of the formula (I) in which $R_1$ stands for hydrogen and $R_2$ for an acylamino group, while $R_3$ has the meaning given above, as well as a process for their production and use for the dyeing of hydrophobic fibre materials.

A special object of the present invention comprises quinophthalone dyestuffs which are free from sulphonic acid groups and correspond to the formula

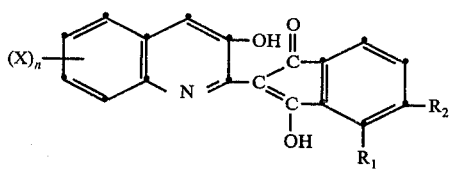

in which $R_1$ and $R_2$ stand for hydrogen or an acylamino group but cannot simultaneously represent hydrogen or acylamino groups; X is a substituent; and $n$ means a number from 0 to 3, including, in particular, mixtures of dyestuffs of the formula (Ia) in which $R_1$ stands for an acylamino group and $R_2$ for hydrogen with dyestuffs of the formula (Ia) in which $R_1$ stands for hydrogen and $R_2$ for an acylamino group, as well as a process for their production and use for the dyeing of hydrophobic fibre materials.

Within the framework of the present application, the term acylamino groups groups primarily includes formyl-amino groups, optionally substituted alkylcarbonyl-, cycloalkylcarbonyl-, arylcarbonyl-, aralkylcarbonyl-, alkylsulphonyl-, arylsulphonyl-, aminocarbonyl-, alkoxycarbonyl-, aralkoxycarbonyl- and aryloxycarbonyl-amino groups.

Suitable alkyl radicals are primarily those with 1 - 4 carbon atoms, such as methyl, ethyl or butyl radicals, which may carry substituents, for example, methoxy, ethoxy or butoxy groups.

Suitable halogen atoms are, for example Cl, Br, F.

Suitable lower alkoxy groups are, for example $OCH_3$, $OC_2H_5$ and $OC_4H_9$.

Suitable cycloalkyl radicals are, for example, cyclohexyl radicals.

Suitable aryl radicals are primarily phenyl radicals which may carry substituents, such as F, Cl, Br or I; nitro groups; alkyl groups with 1 - 4 carbon atoms; alkoxy groups with 1 -4 carbon atoms; and carbalkoxy groups, especially those with 1 - 4 carbon atoms in the alkoxy radical, for example methoxy-carbonyl or butoxy-carbonyl groups. Any substituents, with the exception of sulphonic acid groups, can serve as substituents X, especially halogen atoms, such as chlorine or bromine, and ethyl groups.

The dyestuffs of the formula (I) according to the invention are prepared in that acylamino-phthalic acids of formula

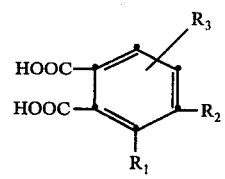

wherein $R_1$ and $R_2$ stand for hydrogen, an acylamino group, a lower alkoxy group or halogen with the proviso that one of the residues $R_1$ and $R_2$ denotes an acylamino group whereas the other residue stands for hydrogen, halogen or a lower alkoxy group, $R_3$ denotes hydrogen, halogen or a lower alkoxy group or their anhydrides or mixtures of dicarboxylic acids of the formula

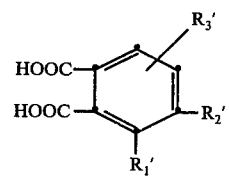

wherein $R_1'$ stands for an acylamino group, $R_2'$ and $R_3'$ denote hydrogen, halogen or a lower alkoxy group and dicarboxylic acids of the formula

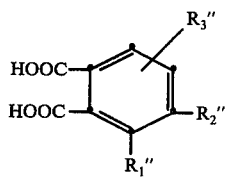

wherein $R_2''$ stands for an acylamino group, $R_1''$ and $R_3''$ denote hydrogen, halogen or a lower alkoxy group or anhydrides of compounds (IIa) and (IIb), are reacted with 3-hydroxy-quinaldines of the formula

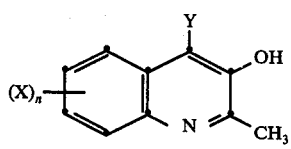

in which X stands for a substituent and n for a number from 0 to 3, and Y represents hydrogen or a carboxyl group which is split off in the course of the reaction, the starting components being so chosen that the final products are free from sulphonic acid groups.

Accordingly the dyestuffs of the formula (Ia) according to the invention are prepared in that acylaminophthalic acids of formula

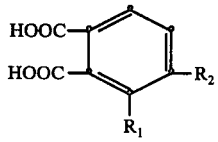
(IIc)

in which $R_1$ and $R_2$ stand for hydrogen or an acylamino group but cannot simultaneously represent hydrogen or acylamino groups, or their anhydrides, or mixtures of dicarboxylic acids of the formula (IIc) in which $R_2$ stands for hydrogen and $R_1$ for an acylamino group, or of their anhydrides, with dicarboxylic acids of the formula (IIc), in which $R_2$ stands for an acylamino group and $R_1$ for hydrogen, or their anhydrides, are reacted with 3-hydroxy-quinaldines of the formula (III).

Suitable starting compounds of the formula (II) are for example: 3-acetylamino-phthalic acid, 3-methoxyacetylamino-, 3-ethoxy-acetylamino-, 3-hydroxyacetylamino-, 3-cyclohexane-carbonylamino-, 3-benzoyl-amino-, 3-(2'-chlorobenzoyl-amino)-, 3-(3'-chlorobenzoyl-amino)-, 3-(4'-chloro-benzoyl-amino)-, 3-(2''-methyl-benzoyl-amino)-, 3-(3'-methylbenzoyl-amino)-, 3-(4-'-methyl-benzoyl-amino)-, 3-(2'-methoxy-benzoyl-amino)-, 3-(3'-methoxy-benzoyl-amino)-, 3-(4'-methoxy-benzoyl-amino)-, 3-(3'-carbethoxy-benzoyl-amino)-, 3-(4'-carbethoxy-benzoyl-amino)-, 4-acetylamino-, 4-methoxy-acetyl-amino-4-ethoxy-acetylamino-, 4-hydroxy-acetylamino-, 4-cyclohexane-carbonylamino-, 4-benzoyl-amino-, 4-(2'-chloro-benzoyl-amino)-, 4-(3'-chloro-benzoyl-amino)-, 4-(4'-chloro-benzoyl-amino)-, 4-(2'-methyl-benzoyl-amino)-, 4-(3'-methyl-benzoyl-amino)-, 4-(4'-methyl-benzoyl-amino)-, 4-(2'-methoxy-benzoyl-amino)-, 4-(3'-methoxy-benzoyl-amino)-, 4-(3'-methoxy-benzoyl-amino)-, 4-(4'-methoxy-benzoyl-amino)-, 4-(3'-carbethoxy-benzoyl-amino)-, 4-(4'-carbethoxy-benzoyl-amino)-phthalic acid, 4-acetylamino-5-methoxy-, 4-acetylamino-5-ethoxy-, 4-acetyl-amino-5-chloro-, 4-acetylamino-5-bromophthalic acid or mixtures of the aforesaid 3- or 4-acylamino-dicarboxylic acids, especially those containing identical acylamino radicals in the 3- or 4-position.

Mixtures of such dicarboxlic acids are obtained in known manner, for example, by the nitration of phthalic acid anhydride with nitric acid in sulphuric acid, reduction of the resultant mixture of 3-nitro-phthalic acid and 4-nitrophthalic acid to form the mixture of the corresponding aminophthalic acids and subsequent acylation.

Suitable starting compounds of the formula (III) are, for example:

3-hydroxy-quinaldine, 3-hydroxy-quinaldine-carboxylic acid-4,3-hydroxy-5,7-dimethyl-quinaldine, 3-hydroxy-6,8-dichloro-quinaldine, 3-hydroxy-6-bromo-quinaldine, 3-hydroxy-6,8-dibromo-quinaldine.

The reaction of (II) with (III) is preferably carried out in a molar ratio of 1 : 1 in inert high-boiling organic solvents, such as chlorobenzene, at temperatures above 100° C, preferably at 160°– 210° C. The yellow dyestuffs thus obtained can easily be isolated by filtering off with suction. They are eminently suitable for dyeing and printing hydrophobic synthetic fibre materials such as polyester fibres, especially fibres consisting of polyethylene terephthalate or of condensation products of bis-hydroxy-methylcyclohexane an terephthalic acid, as well as fibres of cellulose triacetate or polyolefines and superpolyamides and -urethanes. The dyestuffs are particularly suitable for the dyeing of polyester fibres by the so-called "thermosol" process.

Yellow dyeings of good fastness to sublimation, light and rubbing are obtained on the said materials by the dyeing methods customarily used for these materials.

The parts given in the following Examples are parts by weight, the temperatures are given in degrees Centigrade.

EXAMPLE 1

20.3 Parts 3-hydroxy-quinaldine-carboxylic acid-4 and 20.5 parts 3-acetylamino-phthalic acid anhydride are suspended in 300 parts 1,2,4-trichlorobenzene and the mixture is heated at 200° with stirring until a formation of $CO_2$ and water can no longer be detected after about 2 hours. The mixture is cooled, suction-filtered, and the filter residue is washed with benzene. The yield amounts to 32.2 parts = 93% of theory of a yellow dyestuff of the formula

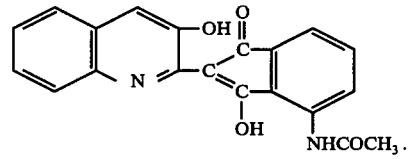

EXAMPLE 2

20.3 Parts 3-hydroxy-quinaldine-carboxylic acid-4 and 20.5 parts 4-acetylamino-phthalic acid anhydride are suspended in 300 parts 1,2,4-trichlorobenzene and heated at 200° with stirring until a formation of $CO_2$ and water can no longer be detected after about 2 hours. The mixture is cooled, the precipitated dyestuff is filtered off with suction, and the filter residue is washed with benzene. The yield amounts to 31 parts = 90% of theory of a dyestuff of the formula

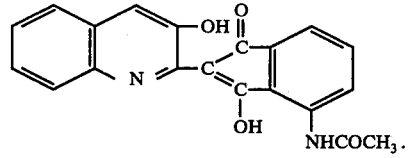

In an analogous manner, condensation of 3-hydroxy-quinaldine or 3-hydroxy-quinaldine-carboxylic acid-4 with the following 3-acylamino-phthalic acids or 4-acylamino-phthalic acids yields yellow dyestuffs which give yellow dyeings of good fastness properties on polyester fibres by the thermosol method: 3-ethoxy-acetyl-amino-phthalic acid, cyclohexane-carbonyl-amino-phthalic acid, 3-benzoyl-amino-phthalic acid, 3-(2'-chloro-benzoyl-amino)-phthalic acid, 3-(4'-chloro-benzoyl-amino)-phthalic acid, 3-(4'-methyl-benzoyl-amino)-phthalic acid, 3-(2'-methoxy-benzoyl-amino)-phthalic acid, 3-(3'-methoxy-benzoyl-amino)-phthalic acid, 3-(4'-methoxy-benzoyl-amino)-phthalic acid, 3-(4'-carbethoxy-benzoyl-amino)-phthalic acid, 4-ethoxy-acetyl-amino-phthalic acid, 4-cyclo-hexane-carbonyl-amino-phthalic acid, 4-benzoyl-amino-phthalic acid, 4-(2'-chloro-benzoyl-amino)-phthalic acid, 4-(4'-chloro-benzoyl-amino)-phthalic acid, 4-(4'-methyl-benzoyl-amino)-phthalic acid, 4-(2'-methoxy-benzoyl-amino)-phthalic acid, 4-(3'-methoxy-benzoyl-amino)-phthalic acid, 4-(4'-methoxy-benzoyl-amino)-phthalic acid, 4-(4'-carbethoxy-benzoyl-amino)-phthalic acid, 4-acetylamino-5-methoxy-phthalic acid, 4-acetyl-amino-5-ethoxy-phthalic acid, 4-acetylamino-5-chloro-phthalic acid, 4-acetylamino-5-bromo-phthalic acid.

EXAMPLE 3

Phthalic acid anhydride is nitrated in known manner in sulphuric acid with nitric acid, the resultant mixture of 3-nitro-phthalic acid and 4-nitro-phthalic acid is reduced in known manner to form the mixture of the amino-phthalic acids and this is converted in the usual way into the mixture of the acetylamino compounds. 22.3 Parts of this mixture of 3-acetylamino-phthalic acid and 4-acetylamino-phthalic acid are heated at boiling temperature under reflux in 200 parts o-dichlorobenzene while stirring. As soon as a clear solution has formed, 20.3 parts 3-hydroxy-quinaldine-carboxylic acid-4 are added and heating is continued at 170° – 180° for 8 hours. The reaction solution is filtered hot, the filtrate is cooled, and the dyestuff mixture is isolated by filtering off with suction. It consists of a mixture of dyestuffs of the formulae

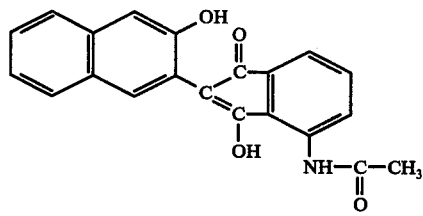

which are present in a proportion of 1 : 1 to about 1 : 2. This mixing proportion can be varied within wide limits, depending on the method applied for nitrating the phthalic acid anhydride. The dyestuff mixture yields dyeings of very good fastness to wet processing, sublimation and light on polyester fibres.

EXAMPLE 4

25 Parts of the dyestuff mixture obtained according to Example 1 are ground with 75 parts of a condensation product obtained from p-naphthalene-sulphonic acid and formaldehyde and with 120 parts of water in a ball mill for 24 hours. The paste is subsequently dried in a vacuum at 50° and the residue is finely ground.

1 Part of this dyestuff powder is stirred into 2000 parts of hot water which contains 8 – 10 parts of a carrier, e.g. o-phenyl-phenol, and which has been adjusted to a pH value of about 4.5 by means of sulphuric acid. A very fine dyestuff suspension is obtained, into which 50 parts of polyester fibres are introduced at 40° – 60°. The dyebath is heated to boiling point within 20 minutes and kept at this temperature for 1 – 1½ hours. The dyed material is then thoroughly rinsed with water and dried. A yellow dyeing of very good fastness to wet processing, sublimation and light is obtained. Compared with the pure dyestuffs, the dyestuff mixture used above has a noticeably improved drawing power.

We claim:

1. The compound having the formula

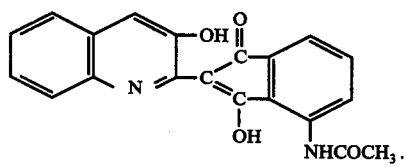

2. The compound having the formula

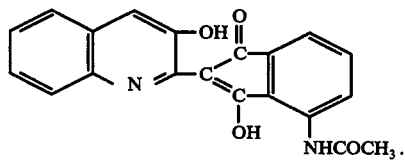

* * * * *

UNITED STATES PATENT AND TRADEMARK OFFICE
CERTIFICATE OF CORRECTION

PATENT NO. : 4,088,651
DATED : May 9, 1978
INVENTOR(S) : Dietmar Kalz, Gerhard Wolfrum It is certified that error appears in the above-identified patent and that said Letters Patent are hereby corrected as shown below:

In the Abstract, last line, "-quinalide." should read --- -quinaldine ---.

Column 1, line 23, "halgen" should read ---halogen---.

Column 4, Example 2, " 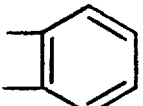 " should be --- 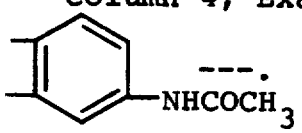 ---.

Column 4, line 27, "-4are" should read ---4 are---.

Column 5, Example 3, N atom in the left nucleus is omitted, " 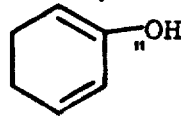 " should be --- 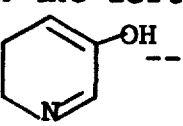 ---.

Column 6, Claim 2, " 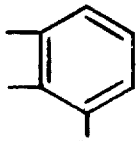 " should be --- 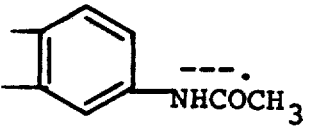 ---.

UNITED STATES PATENT AND TRADEMARK OFFICE
CERTIFICATE OF CORRECTION

PATENT NO. : 4,088,651

DATED : May 9, 1978

INVENTOR(S) : Dietmar Kalz, Gerhard Wolfrum

It is certified that error appears in the above-identified patent and that said Letters Patent are hereby corrected as shown below:

Column 5, Example 3, please add the following formula (which is the second of the two formulas):

and 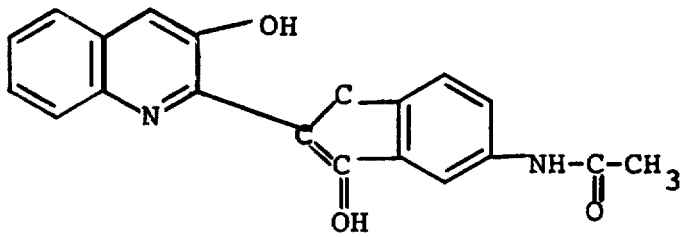

Signed and Sealed this

Twentieth Day of February 1979

[SEAL]

Attest:

RUTH C. MASON
*Attesting Officer*

DONALD W. BANNER
*Commissioner of Patents and Trademarks*